United States Patent
Wu

(10) Patent No.: US 10,660,025 B2
(45) Date of Patent: May 19, 2020

(54) DEVICE AND METHOD FOR HANDLING DUAL CELLULAR SYSTEM AGGREGATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 37 days.

(21) Appl. No.: 15/628,608

(22) Filed: Jun. 20, 2017

(65) Prior Publication Data

US 2017/0374607 A1    Dec. 28, 2017

Related U.S. Application Data

(60) Provisional application No. 62/354,090, filed on Jun. 23, 2016.

(51) Int. Cl.
*H04W 48/16* (2009.01)
*H04W 76/15* (2018.01)
(Continued)

(52) U.S. Cl.
CPC ............ *H04W 48/16* (2013.01); *H04L 5/001* (2013.01); *H04L 5/0091* (2013.01);
(Continued)

(58) Field of Classification Search
CPC . H04W 48/16; H04W 76/15; H04W 72/1215; H04W 72/08; H04W 28/18;
(Continued)

(56) References Cited

U.S. PATENT DOCUMENTS

2010/0267394 A1*  10/2010  Wu ................. H04W 24/10
                                                        455/450
2011/0205976 A1    8/2011  Roessel
(Continued)

FOREIGN PATENT DOCUMENTS

CN      102300328 A    12/2011
CN      104023376 A     9/2014
(Continued)

OTHER PUBLICATIONS

Office action dated Dec. 19, 2017 for the Taiwan application No. 106120975, filing date Jun. 23, 2017, p. 1~7.
(Continued)

*Primary Examiner* — Andrew Lai
*Assistant Examiner* — Harry H Kim
(74) *Attorney, Agent, or Firm* — Winston Hsu

(57) ABSTRACT

A communication device for handling dual cellular system aggregation includes a storage device for storing instructions and a processing circuit coupled to the storage device. The communication device connects to a network via a first radio access technology (RAT); transmitting a "first RAT-second RAT" joint aggregation capability and at least one of a first RAT sole aggregation capability and a second RAT sole aggregation capability to the network; receiving a second RAT configuration configuring a "first RAT-second RAT" joint aggregation; connecting to the network via a second RAT according to the second RAT configuration; and receiving a first data via the first RAT and a second data via the second RAT, after connecting to the network via both of the first RAT and the second RAT.

14 Claims, 8 Drawing Sheets

(51) Int. Cl.
  *H04W 72/12*   (2009.01)
  *H04W 28/18*   (2009.01)
  *H04W 72/08*   (2009.01)
  *H04W 28/02*   (2009.01)
  *H04W 40/12*   (2009.01)
  *H04W 88/10*   (2009.01)
  *H04L 5/00*    (2006.01)

(52) U.S. Cl.
  CPC .......... *H04W 28/18* (2013.01); *H04W 72/08* (2013.01); *H04W 72/1215* (2013.01); *H04W 76/15* (2018.02); *H04W 88/10* (2013.01); *H04W 28/0247* (2013.01); *H04W 40/12* (2013.01)

(58) Field of Classification Search
  CPC . H04W 88/10; H04W 28/0247; H04W 40/12; H04L 5/0091; H04L 5/001
  See application file for complete search history.

(56) References Cited

U.S. PATENT DOCUMENTS

| | | |
|---|---|---|
| 2011/0268048 A1 | 11/2011 | Toskala |
| 2011/0275359 A1 | 11/2011 | Sebire |
| 2012/0184281 A1* | 7/2012 | Kim .................. H04W 72/0453 455/450 |
| 2013/0083783 A1 | 4/2013 | Gupta |
| 2013/0242897 A1* | 9/2013 | Meylan ................ H04W 28/16 370/329 |
| 2013/0308481 A1 | 11/2013 | Kazmi |
| 2014/0335883 A1* | 11/2014 | Ericson ................ H04W 52/26 455/452.2 |
| 2015/0245302 A1* | 8/2015 | Lim ..................... H04W 52/34 455/522 |
| 2015/0257013 A1 | 9/2015 | Patel |
| 2016/0094728 A1 | 3/2016 | Saito |
| 2018/0014226 A1* | 1/2018 | Li ........................ H04L 47/41 |
| 2018/0027562 A1* | 1/2018 | Jeon .................... H04B 7/0413 455/450 |

FOREIGN PATENT DOCUMENTS

| | | |
|---|---|---|
| CN | 104811411 A | 7/2015 |
| EP | 2242300 A1 | 10/2010 |
| JP | 2015-149566 A | 8/2015 |
| TW | 201340664 A | 10/2013 |
| WO | 2017/026334 A1 | 2/2017 |

OTHER PUBLICATIONS

3GPP TSG-RAN WG2 #97bis R2-1702680, Apr. 2017.
Search Report dated Oct. 18, 2017 for EP application No. 17177597.6, pp. 1-4.
Office Action dated Jul. 17, 2018 for the Japanese Application No. 2017-121977, filing date Jun. 22, 2017, pp. 1-2.
Samsung, Co-existence scenarios for LTE and 5G, 3GPP TSG-RAN WG2 Meeting #93bis, R2-162299, Apr. 11-15, 2016, Dubrovnik, Croatia.
CMCC, Considerations on standalone and non-standalone operation of new RAT, 3GPP TSG RAN WG3 #91 BIS, R3-160806, Apr. 11-15, 2016, Bangalore, India.
Office Action dated Oct. 30, 2018 for the Japanese Application No. 2017-121977, filing date Jun. 22, 2017, pp. 1-2.
Office action dated Nov. 6, 2019 for the China application No. 201710488709.4, filing date Jun. 23, 2017, p. 1-10.

* cited by examiner

| Band combination | Band number | Bandwidth |
|---|---|---|
| LTE CA/DC band combination | CA_1B_7A_28A or DC_1B_7A_28A | Band 1, Band 7, Band 28 | "A" indicates 20 MHz; "B" indicates 40 MHz |
| 5G CA/DC band combination | N/A | N/A | N/A |
| LTE-5G CA/DC band combination | CA_LTE_7A_28A_5G_1J or DC_LTE_7A_28A_5G_1J | Band 1, Band 7, Band 28 | "A" indicates 20 MHz; "J" indicates 40 MHz |

| Band combination | Band number | Bandwidth |
|---|---|---|
| LTE CA/DC band combination | CA_1A_3A_7A_28A or DC_1A_3A_7A_28A | Band 1, Band 3, Band 7, Band 28 | "A" indicates 20 MHz; |
| 5G CA/DC band combination | CA_93K_100K or DC_93K_100K | Band 93, Band 100 | "K" indicates 100 MHz; |
| LTE-5G CA/DC band combination | CA_LTE_1A_3A_7A_28A_5G_100K or DC_LTE_1A_3A_7A_28A_5G_100K | Band 1, Band 3, Band 7, Band 28, Band 100 | "A" indicates 20 MHz; "K" indicates 100 MHz |

FIG. 5

| | Band combination | Band number | Bandwidth |
|---|---|---|---|
| LTE CA/DC band combination | CA_1E_28E or DC_1E_28E | Band 1, Band 28 | "E" indicates 100 MHz |
| 5G CA/DC band combination | CA_93K_100K or DC_93K_100K | Band 93, Band 100 | "K" indicates 100 MHz |
| LTE-5G CA/DC band combination | CA_LTE_1E_5G_100K or DC_LTE_1E_5G_100K | Band 1, Band 28 | |

| Band combination | Band number | Bandwidth |
|---|---|---|
| LTE CA/DC band combination | CA_1E_28E or DC_1E_28E | Band 1, Band 28 | "E" indicates 100 MHz |
| 5G CA/DC band combination | CA_1E_28E or DC_1E_28E | Band 1, Band 28 | "E" indicates 100 MHz |
| LTE-5G CA/DC band combination | CA_LTE_28E_5G_1E or DC_LTE_28E_5G_1E | Band 1, Band 28 | |

FIG. 7

DEVICE AND METHOD FOR HANDLING DUAL CELLULAR SYSTEM AGGREGATION

CROSS REFERENCE TO RELATED APPLICATIONS

This application claims the benefit of U.S. Provisional Application No. 62/354,090 filed on Jun. 23, 2016, which is incorporated herein by reference.

BACKGROUND OF THE INVENTION

1. Field of the Invention

The present invention relates to a device and a method used in a wireless communication system, and more particularly, to a device and a method of handling dual cellular system aggregation.

2. Description of the Prior Art

A long-term evolution (LTE) system is evolved continuously to increase peak data rate and throughput by using advanced techniques, such as carrier aggregation (CA), dual connectivity (DC), licensed-assisted access, etc.

In a fifth-generation (5G) operation scenario, the UE may simultaneously connect to an eNB via a first carrier for a LTE communication and to a 5G base station via a second carrier for a 5G communication.

SUMMARY OF THE INVENTION

The present invention therefore provides a communication device for handling dual cellular system aggregation to solve the abovementioned problem.

A communication device for handling dual cellular system aggregation comprises a storage device for storing instructions and a processing circuit coupled to the storage device. The processing circuit is configured to execute the instructions stored in the storage device. The instructions comprise connecting to a network via a first radio access technology (RAT); transmitting a "first RAT-second RAT" joint aggregation capability and at least one of a first RAT sole aggregation capability and a second RAT sole aggregation capability to the network, when connecting to the network; receiving a second RAT configuration configuring a "first RAT-second RAT" joint aggregation from the network; connecting to the network via a second RAT according to the second RAT configuration while connecting to the network via the first RAT; and receiving a first data via the first RAT and a second data via the second RAT, after connecting to the network via both of the first RAT and the second RAT.

A network for handling dual cellular system aggregation comprises a storage device for storing instructions and a processing circuit coupled to the storage device. The processing circuit is configured to execute the instructions stored in the storage device. The instructions comprise connecting to a communication device via a first radio access technology (RAT); receiving a "first RAT-second RAT" joint aggregation capability and at least one of a first RAT sole aggregation capability and a second RAT sole aggregation capability from the communication device, when connecting to the communication device; transmitting a second RAT configuration configuring a "first RAT-second RAT" joint aggregation to the communication device, after receiving the "first RAT-second RAT" joint aggregation capability; connecting to the communication device via a second RAT while connecting to the communication device via the first RAT, in response to the transmission of the second RAT configuration; and transmitting a first data via the first RAT and a second data via the second RAT to the communication device, after connecting to the communication device via both of the first RAT and the second RAT.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a table of LTE CA/DC band combination, 5G CA/DC band combination and LTE-5G CA/DC band combination according to an example of the present invention.

FIG. 5 is a table of LTE CA/DC band combination, 5G CA/DC band combination and LTE-5G CA/DC band combination according to an example of the present invention.

FIG. 7 is a table of LTE CA/DC band combination, 5G CA/DC band combination and LTE-5G CA/DC band combination according to an example of the present invention.

DETAILED DESCRIPTION

Figure 1:
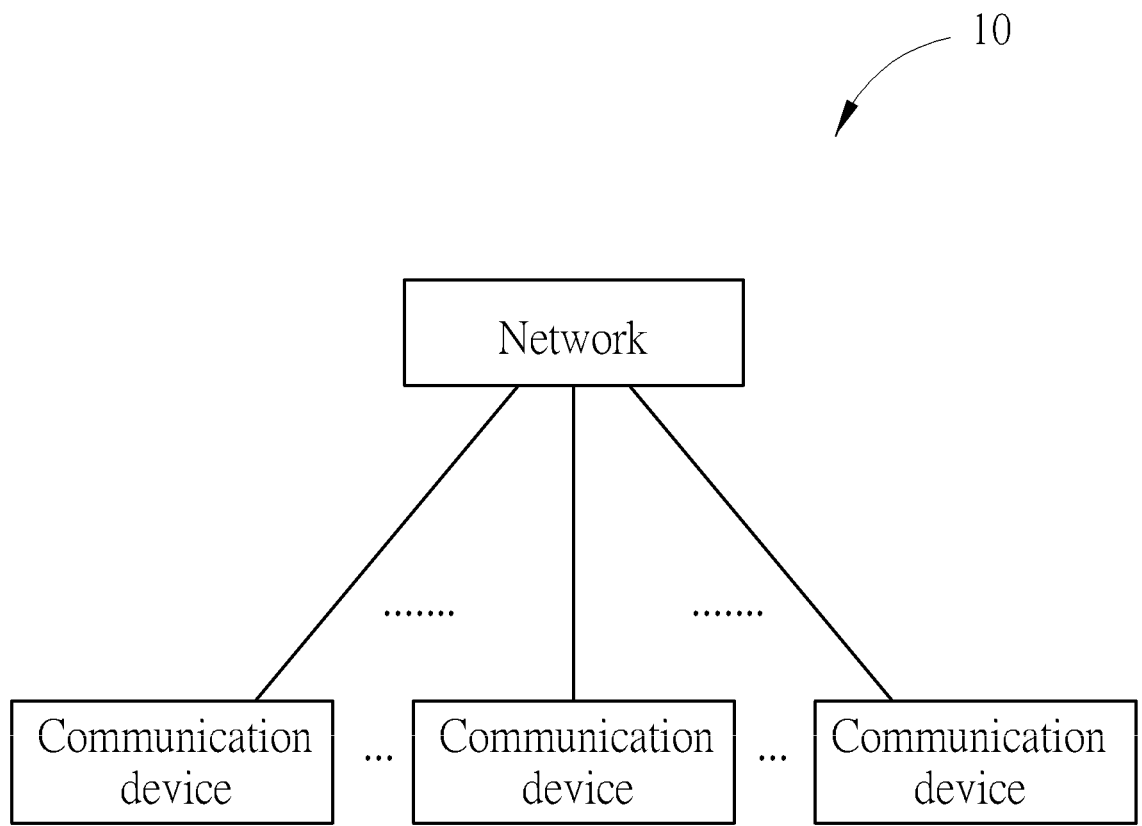
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s).

In FIG. 1, the network and the communication devices are simply utilized for illustrating the structure of the wireless communication system 10. The network may include an evolved universal terrestrial radio access network (E-UTRAN) including at least one evolved Node-B (eNB). The network may include a fifth-generation (5G) radio access network including at least one 5G BS which employs orthogonal frequency-division multiplexing (OFDM) and/or non-OFDM (e.g., filtered OFDM (F-OFDM), Generalized Frequency Division Multiplexing (GFDM), Universal Filtered Multi-Carrier (UFMC) or Filter Back Multi-Carrier (FBMC)), and a transmission time interval (TTI) shorter than 1 ms (e.g. 100 or 200 microseconds). In general, a BS may also be used to refer any of the eNB and the 5G BS. The network may include a core network connecting to the BS.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

The 3rd Generation Partnership Project (3GPP) is discussing 5G (or called new radio, NR) communication. The 5G communication supports carrier aggregation (CA) and/or dual connectivity (DC) similarly as LTE. A 5G UE may indicate its 5G CA capability and/or 5G DC capability to a 5G BS. A LTE UE may indicate its LTE CA capability and/or DC capability to an eNB. The CA capability and/or the DC capability indicate the number of carriers to be aggregated is supported by the UE.

In a LTE and the 5G interworking scenario (i.e., dual cellular system aggregation), the UE may simultaneously connect to a LTE eNB via a first carrier for a LTE communication and to a 5G BS via a second carrier for a 5G communication. In another LTE and 5G interworking scenario, the UE may simultaneously connect to a BS capable of both the LTE and 5G communications via the first carrier for the LTE communication and the second carrier for the 5G communication (e.g., intra-BS CA). Each of the first carrier and the second carrier may belong to a licensed spectrum or an unlicensed spectrum. However, it is still unknown how the UE can indicate a capability of connecting with a LTE eNB and/or a 5G BS. Thus, handling the dual cellular system aggregation is an important problem to be solved.

For example, the UE indicates to a BS that it is capable of aggregation of a maximum of 4 downlink (DL) LTE component carriers (CCs) in its LTE CA/DC (i.e., CA or DC) capability and is capable of a maximum 4 DL 5G CCs in its 5G CA/DC capability. The BS may think that the UE supports an aggregation of 4 DL LTE CCs and 4 DL 5G CCs in a LTE-5G CA or DC, but the UE may not be capable of this aggregation.

Figure 2:
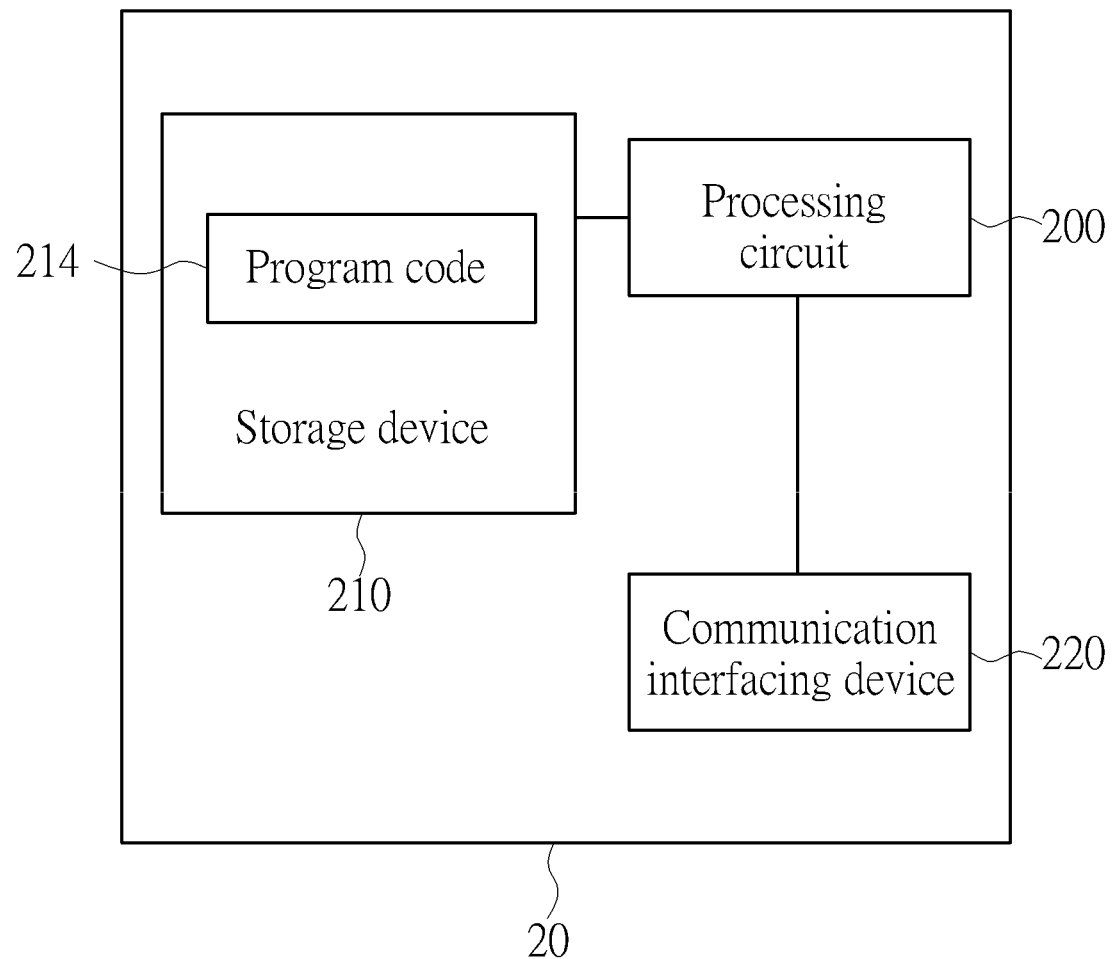
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 is preferably a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
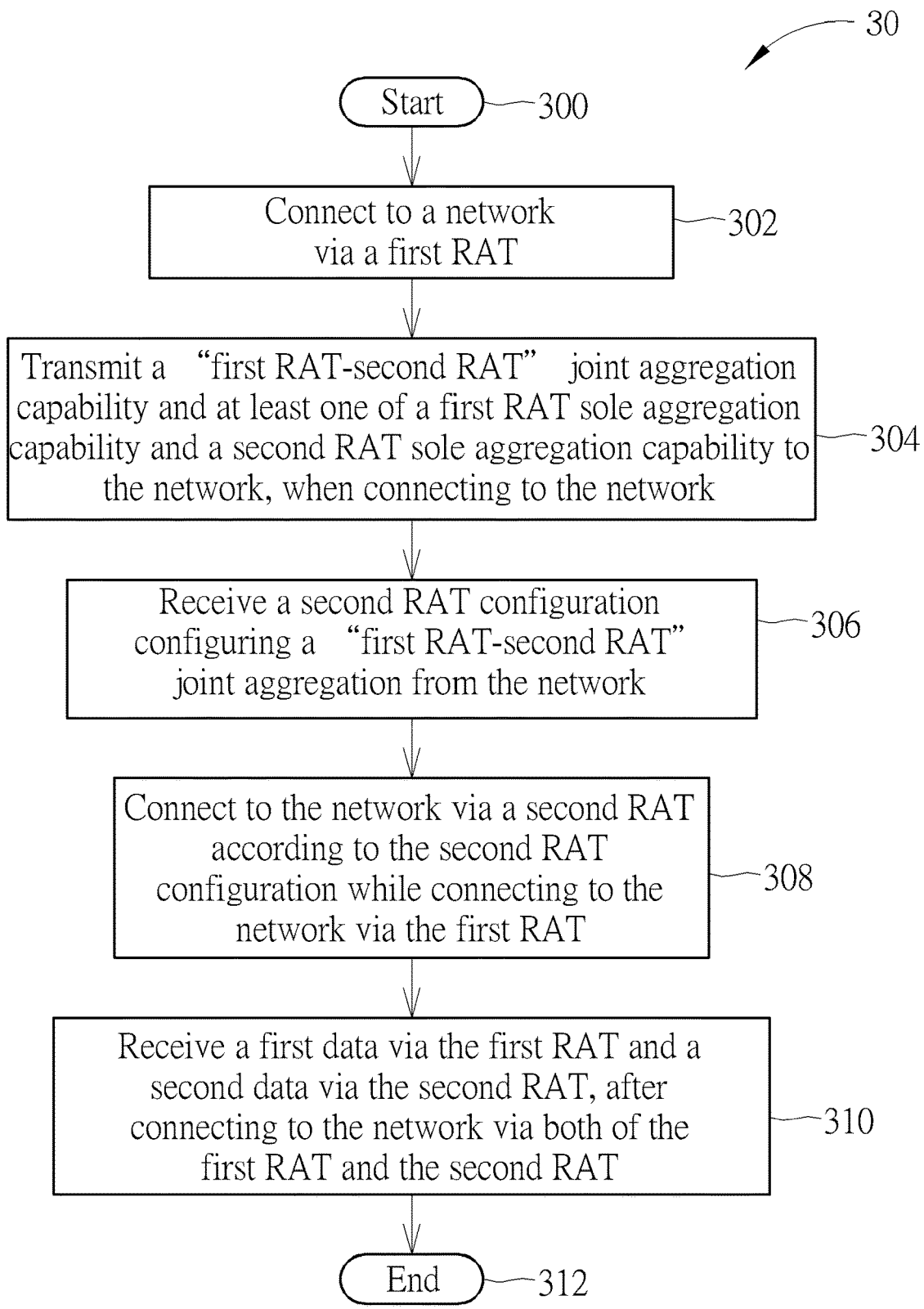
FIG. 3 is a flowchart of a process according to an example of the present invention.

FIG. 3 is a flowchart of a process 30 according to an example of the present invention. The process 30 can be utilized in a UE, for handling dual cellular system aggregation. The process 30 includes the following steps:

Step 300: Start.

Step 302: Connect to a network via a first RAT.

Step 304: Transmit a "first RAT-second RAT" joint aggregation capability and at least one of a first RAT sole aggregation capability and a second RAT sole aggregation capability to the network, when connecting to the network.

Step 306: Receive a second RAT configuration configuring a "first RAT-second RAT" joint aggregation from the network.

Step 308: Connect to the network via a second RAT according to the second RAT configuration while connecting to the network via the first RAT.

Step 310: Receive a first data via the first RAT and a second data via the second RAT, after connecting to the network via both of the first RAT and the second RAT.

Step 312: End.

According to the process 30, the UE connects to a network (e.g., a first BS of the network) via a first RAT. When the UE connects to the network, the UE transmits a "first RAT-second RAT" joint aggregation capability and at least one of a first RAT sole aggregation capability and a second RAT sole aggregation capability to the network. Then, the UE receives a second RAT configuration configuring a "first RAT-second RAT" joint aggregation from the network. The UE connects to the network via a second RAT (e.g., a second BS of the network) according to the second RAT configuration while connecting to the network via the first RAT. After (i.e., when or while) connecting to the network via both of the first RAT and the second RAT, the UE receives a first data via the first RAT (e.g., from the first BS) and a second data via the second RAT (e.g., from the second BS). In other words, the UE can simultaneously receive the first data via the first RAT and the second data via the second RAT, because the aggregation capability is indicated to the network.

Realization of the process 30 is not limited to the above description. The following examples may be applied to the process 30.

In one example, the first BS and the second BS are different BSs. The UE may transmit one or both of the first RAT sole aggregation capability and the second RAT sole aggregation capability. In one example, if the UE supports the aggregation in the first RAT but does not support the aggregation in the second RAT, the UE transmits the first RAT sole aggregation capability but does not transmit the second RAT sole aggregation capability.

In one example, the "first RAT-second RAT" joint aggregation capability may indicate a "first RAT-second RAT" joint aggregation combination supported by the UE. The "first RAT-second RAT" joint aggregation combination may indicate a first number of first carrier (s) of the first RAT and a second number of second carrier (s) of the second RAT on which the UE is capable of simultaneously performing reception or transmission for the "first RAT-second RAT" joint aggregation. In one example, the first RAT sole aggregation capability indicates a first RAT sole aggregation combination supported by the UE. The first RAT sole aggregation combination indicates a third number of third carrier(s) of the first RAT on which the UE is capable of simultaneously performing reception or transmission for the first RAT sole aggregation. In one example, the second RAT sole aggregation capability indicates a second RAT sole aggregation combination supported by the UE. The second RAT sole aggregation combination indicates a fourth number of fourth carrier(s) of the second RAT on which the UE is capable of simultaneously performing reception or transmission for the second RAT sole aggregation. Thus, the UE can flexibly indicate the "first RAT-second RAT" joint aggregation capability besides the first RAT sole aggregation capability and the second RAT sole aggregation capability. The "carrier(s)" means at least one carrier.

The first carrier(s) and the third carrier(s) may have same carrier(s). The second carrier(s) and the fourth carrier(s) may have same carrier(s). In one example, the first number is less than or equal to the third number, and the second number is less than or equal to the fourth number. For example, the first number is less than the third number and the second number is less than the fourth number, because at least one component (e.g., the radio frequency (RF) transceiver(s)) in the UE is shared for the LTE communication and the 5G communication. In one example, the sum of the first number and the second number may be less than or equal to the sum of the third number and the fourth number. For example, the sum of the first number and the second number is less than the sum of the third number and the fourth number, because at least one component (e.g., the RF transceiver(s)) in the UE is shared for the LTE communication and the 5G communication.

In one example, the "first RAT-second RAT" joint aggregation combination indicates first band(s) and first bandwidth(s) for the first carrier(s) of the first RAT, and indicates second band(s) and second bandwidth(s) for the second carrier(s) of the second RAT. The first RAT sole aggregation combination may indicate third band(s) and third bandwidth(s) for the third carrier(s) of the first RAT. The second RAT sole aggregation combination may indicate fourth band(s) and fourth bandwidth(s) for the fourth carrier(s) of the second RAT. In one example, the UE indicates a first maximum bandwidth of a component carrier (CC) in a band in the first RAT sole aggregation combination or the second RAT sole aggregation combination, and indicates a second maximum bandwidth of the CC in the band in the "first RAT-second RAT" joint aggregation combination. The first maximum bandwidth may be larger than or equal to the second maximum bandwidth. The "band(s)" means at least one band. The "bandwidth(s)" means at least one bandwidth(s).

In one example, the "first RAT-second RAT" joint aggregation capability indicates a first maximum number of Multiple Input Multiple Output (MIMO) layers for the "first RAT-second RAT" joint aggregation combination. The first RAT sole aggregation capability may indicate a second maximum number of MIMO layers for the first RAT sole aggregation combination (e.g., for the third carrier(s) of the first RAT). The second RAT sole aggregation capability may indicate a third maximum number of MIMO layers for the second RAT sole aggregation combination (e.g., for the fourth carrier(s) of the second RAT). The first maximum number may be less than or equal to the second maximum number, the third maximum number or the minimum of the second maximum number and the third maximum number.

In one example, the "first RAT-second RAT" joint aggregation capability indicates a fourth maximum number of MIMO layers for the first RAT in the "first RAT-second RAT" joint aggregation combination (e.g., for the first carrier(s) of the first RAT), and indicates a fifth maximum number of MIMO layers for the second RAT in the "first RAT-second RAT" joint aggregation combination (e.g., for the second carrier(s) of the second RAT). The fourth maximum number may be less than or equal to the second maximum number, and the fifth maximum number may be less than or equal to the third maximum number.

In one example, the network may configure a MIMO operation for the "first RAT-second RAT" joint aggregation, the first RAT sole aggregation or the second RAT sole aggregation according to a corresponding maximum number of MIMO layers as described above.

In one example, the "first RAT-second RAT" joint aggregation capability indicates at least one first beamforming capability for the second RAT in the "first RAT-second RAT" joint aggregation combination (e.g., for the second carrier(s) of the second RAT). The second RAT sole aggregation capability may indicate at least one second beamforming capability for the second RAT sole aggregation combination (e.g., for the fourth carrier(s) of the second RAT). The first RAT sole aggregation capability may or may not indicate at least one third beamforming capability (e.g., for the third carrier(s) of the first RAT). The network may configure a first beamforming operation according to the at least one first beamforming capability, when the network configures the "first RAT-second RAT" joint aggregation according to the "first RAT-second RAT" joint aggregation combination. The network may configure a second beamforming operation according to the at least one second beamforming capability, when the network configures the second RAT sole aggregation according to the second RAT sole aggregation combination. The at least one first beamforming capability may be same as or different from the at least one second beamforming capability.

In one example, the first RAT is a LTE and, the second RAT is a 5G. The first RAT sole aggregation capability may be a LTE CA or DC (CA/DC) capability, and the first RAT sole aggregation combination may be a LTE CA/DC band combination. The second RAT sole aggregation capability may be a 5G CA/DC capability, and the second RAT sole aggregation combination may be a 5G CA/DC band combination. The "first RAT-second RAT" joint aggregation capability may be a LTE-5G joint CA/DC capability, and the "first RAT-second RAT" joint aggregation combination may be a LTE-5G CA/DC band combination. In one example, the first RAT is a 5G, and the second RAT is a LTE. The first RAT sole aggregation capability may be a 5G CA/DC capability, and the first RAT sole aggregation combination may be a 5G CA/DC band combination. The second RAT sole aggregation capability may be a LTE CA/DC capability, and the second RAT sole aggregation combination may be a LTE CA/DC band combination. The "first RAT-second RAT" joint aggregation capability may be a 5G-LTE joint CA/DC capability, and the "first RAT-second RAT" joint aggregation combination may be a 5G-LTE CA/DC band combination. The LTE-5G joint CA/DC capability may be the same as or different from the 5G-LTE joint CA/DC capability. A LTE CC may have a bandwidth of 1.4, 3, 5, 10, 15 or 20 MHz. A 5G CC may have the same bandwidth as that of the LTE CC or different bandwidth from that of the LTE CC. In one example, the 5G CC may have a bandwidth of 40, 60, 80 or 100 MHz.

In one example, the first RAT is a High Speed Packet Access (HSPA), and the second RAT is a LTE. The first RAT sole aggregation capability may be a HSPA CA capability, and the first RAT sole aggregation combination may be a HSPA CA combination indicating a support of dual cell High Speed Downlink Packet Access (HSDPA), three carrier (3C) HSDPA, four carrier (4C) HSDPA or eight carrier HSDPA. The second RAT sole aggregation capability may be a LTE CA/DC capability, and the second RAT sole aggregation combination may be a LTE CA/DC band combination. The "first RAT-second RAT" joint aggregation capability may be a HSPA-LTE CA/DC capability, and the "first RAT-second RAT" joint aggregation combination may be a HSPA-LTE CA/DC band combination. In one example, the first RAT may be a LTE, and the second RAT may be a HSPA. The first RAT sole aggregation capability may be a LTE CA/DC capability, and the first RAT sole aggregation combination may be a LTE CA/DC band combination. The second RAT sole aggregation capability may be a HSPA CA capability, and the second RAT sole aggregation combination may be a HSPA CA combination. The "first RAT-second RAT" joint aggregation capability may be a LTE-HSPA CA/DC capability, and the "first RAT-second RAT" joint aggregation combination may be a LTE-HSPA CA/DC band combination. A HSPA carrier bandwidth may be 5 MHz.

FIG. 4 is a table 40 of LTE CA/DC band combination, 5G CA/DC band combination and LTE-5G CA/DC band combination according to an example of the present invention. The UE supports a maximum of 4 LTE CCs in LTE CA/DC. For example, LTE CA/DC band combinations CA_1B_7A_28A and DC_1B_7A_28A indicate that the LTE CA and the LTE DC include 4 LTE CCs ("A" indicates a bandwidth of 20 MHz, i.e., 1 LTE CC; "B" indicates a bandwidth of 40 MHz, i.e., 2 LTE CCs) allocated to 3 bands (Band 1, Band 7 and Band 28). The UE does not support 5G CA/DC. The UE supports a maximum of 2 LTE CCs and a maximum of 1 5G CC in LTE-5G joint CA/DC. For example, LTE-5G CA/DC band combinations CA_LTE_7A_28A_5G_1J and DC_LTE_7A_28A_5G_1J indicate that the LTE-5G CA and the LTE-5G DC include 2 LTE CCs ("A" indicates a bandwidth of 20 MHz, i.e., 1 LTE CC) allocated to 2 bands (Band 7 and Band 28) and 1 5G CC ("J" indicates a bandwidth of 40 MHz, i.e., 1 5G CC) allocated to 1 band (Band 1). Accordingly, the LTE CA/DC capability indicates 4 LTE CCs, and the LTE-5G CA/DC capability indicates 2 LTE CCs and 1 5G CC. In short, the LTE CA/DC capability indicates the LTE CA/DC band combination, and the LTE-5G CA/DC capability indicates the LTE-5G CA/DC band combination.

FIG. 5 is a table 50 of LTE CA/DC band combination, 5G CA/DC band combination and LTE-5G CA/DC band combination according to an example of the present invention. The UE supports a maximum of 4 LTE CCs in LTE CA/DC. For example, LTE CA/DC band combinations CA_1A_3A_7A_28A and DC_1A_3A_7A_28A indicate that the LTE CA and the LTE DC include 4 LTE CCs ("A" indicates a bandwidth of 20 MHz, i.e., 1 LTE CC) allocated to 4 bands (Band 1, Band 3, Band 7 and Band 28). The UE supports a maximum of 2 5G CCs in 5G CA/DC. For example, 5G CA/DC combinations CA_93K_100K and DC_93K_100K indicate that the 5G CA and the 5G DC include 2 5G CCs ("K" indicates a bandwidth of 100 MHz, i.e., 1 5G CC) allocated to 2 bands (Band 93 and Band 100). The UE supports a maximum of 4 LTE CCs and a maximum of 1 5G CC in 5G-LTE joint CA/DC. For example, LTE-5G CA/DC band combinations CA_LTE_1A_3A_7A_28A_5G_100K and DC_LTE_1A_3A_7A_28A_5G_100K indicate that the LTE-5G CA and the LTE-5G DC include 4 LTE CCs ("A" indicates a bandwidth of 20 MHz, i.e., 1 LTE CC) allocated to 4 bands (Band 1, Band 3, Band 7 and Band 28) and 1 5G CC ("K" indicates a bandwidth of 100 MHz, i.e., 1 5G CC) in 1 band (Band 100). Accordingly, the LTE CA/DC capability indicates 4 LTE CCs, the 5G CA/DC capability indicates 2 5G CCs, and the LTE-5G CA/DC capability indicates 4 LTE CCs and 1 5G CC. In short, the LTE CA/DC capability indicates the LTE CA/DC band combination, the 5G CA/DC capability indicates the 5G CA/DC band combination, and the LTE-5G CA/DC capability indicates the LTE-5G CA/DC band combination.

Figure 6:
FIG. 6 is a table of LTE CA/DC band combination, 5G CA/DC band combination and LTE-5G CA/DC band combination according to an example of the present invention.

FIG. 6 is a table 60 of LTE CA/DC band combination, 5G CA/DC band combination and LTE-5G CA/DC band combination according to an example of the present invention. The UE supports a maximum of 10 LTE CCs in LTE CA/DC. For example, LTE CA/DC band combinations CA_1E_28E and DC_1E_28E indicate that the LTE CA and the LTE DC include 10 LTE CCs ("E" indicates a bandwidth of 100 MHz, i.e., 5 LTE CCs) allocated to 2 bands (Band 1 and Band 28). The UE supports a maximum of 2 5G CCs in 5G CA/DC. For example, 5G CA/DC combinations CA_93K_100K and DC_93K_100K indicate that the 5G CA and the 5G DC include 2 5G CCs ("K" indicates a bandwidth of 100 MHz, i.e., 1 5G CC) allocated to 2 bands (Band 93 and Band 100). The UE supports a maximum of 5 LTE CCs and a maximum of 1 5G CC in 5G-LTE joint CA/DC. For example, LTE-5G CA/DC band combinations CA_LTE_1E_5G_100K and DC_LTE_1E_5G_100K indicate that the LTE-5G CA and the LTE-5G DC include 5 LTE CCs allocated to 1 band (Band 1) and 1 5G CC in 1 band (Band 100). Accordingly, the LTE CA/DC capability indicates 10 LTE CCs, the 5G CA/DC capability indicates 2 5G CCs, and the LTE-5G CA/DC capability indicates 5 LTE CCs and 1 5G CC. In short, the LTE CA/DC capability indicates the LTE CA/DC band combination, the 5G CA/DC capability indicates the 5G CA/DC band combination, and the LTE-5G CA/DC capability indicates the LTE-5G CA/DC band combination.

FIG. 7 is a table 70 of LTE CA/DC band combination, 5G CA/DC band combination and LTE-5G CA/DC band combination according to an example of the present invention. The UE supports a maximum of 10 LTE CCs in LTE CA/DC. For example, LTE CA/DC band combinations CA_1E_28E and DC_1E_28E indicate that the LTE CA and the LTE DC include 10 LTE CCs ("E" indicates a bandwidth of 100 MHz, i.e., 5 LTE CC) allocated to 2 bands (Band 1 and Band 28). The UE supports a maximum of 10 5G CCs in 5G CA/DC. For example, 5G CA/DC combinations CA_1E_28E and DC_1E_28E indicate that the 5G CA and the 5G DC include 5 5G CCs ("E" indicates a bandwidth of 100 MHz, i.e., 5 5G CCs) allocated to 2 bands (Band 1 and Band 28). The UE supports a maximum of 5 LTE CCs and a maximum of 5 5G CCs in 5G-LTE joint CA/DC. For example, LTE-5G CA/DC band combinations CA_LTE_28E_5G_1E and DC_LTE_28E_5G_1E indicate that the LTE-5G CA and the LTE-5G DC include 5 LTE CCs allocated to 1 band (Band 28) and 5 5G CCs allocated to 1 band (Band 1). Accordingly, the LTE CA/DC capability indicates 10 LTE CCs, the 5G CA/DC capability indicates 10 5G CCs, and the LTE-5G CA/DC capability indicates 5 LTE CCs and 5 5G CC. In short, the LTE CA/DC capability indicates the LTE CA/DC band combination, the 5G CA/DC capability indicates the 5G CA/DC band combination, and the LTE-5G CA/DC capability indicates the LTE-5G CA/DC band combination.

Figure 8:
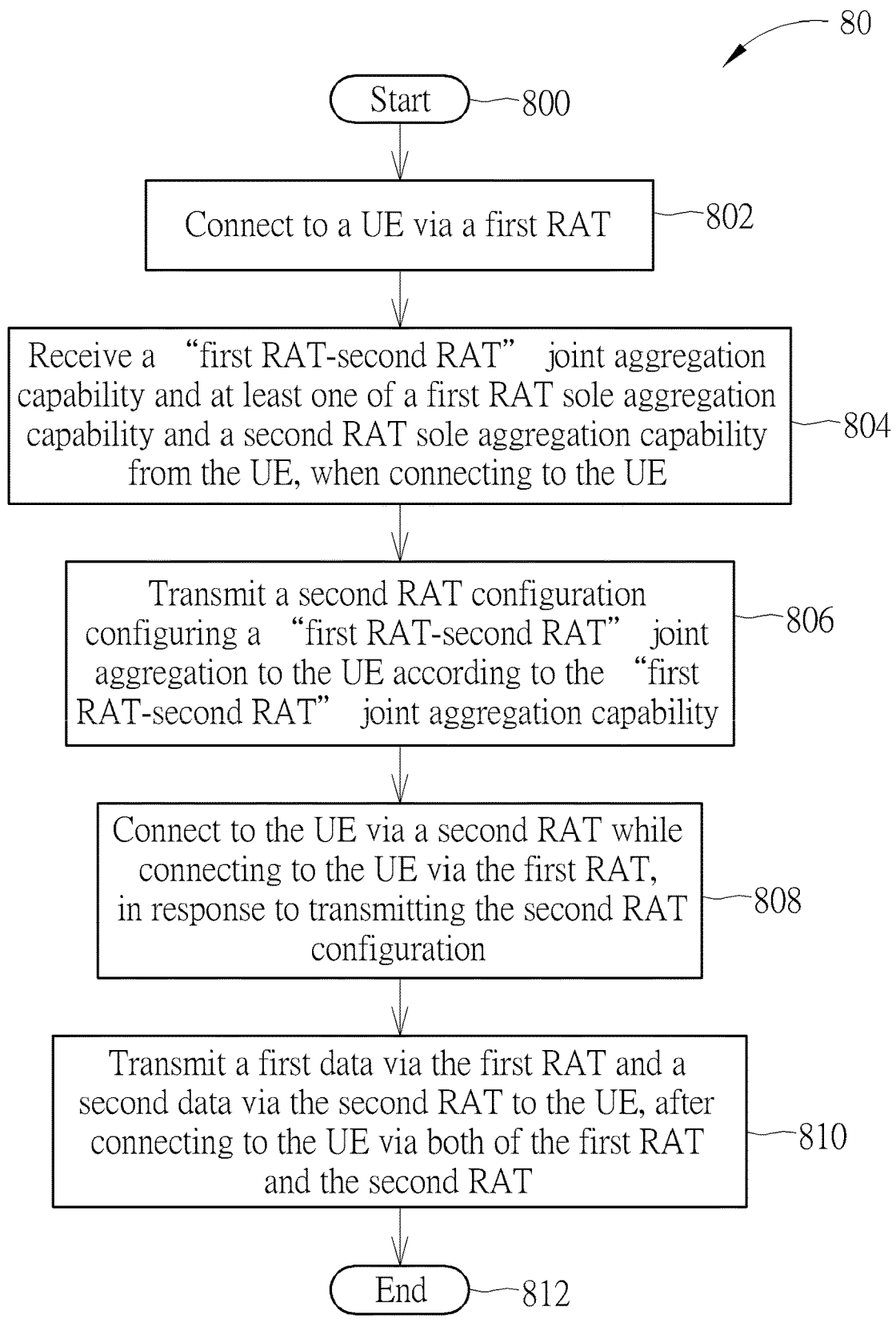
FIG. 8 is a flowchart of a process according to an example of the present invention.

FIG. 8 is a flowchart of a process 80 according to an example of the present invention. The process 80 can be utilized in a network, for handling dual cellular system aggregation. The process 80 includes the following steps:

Step 800: Start.

Step 802: Connect to a UE via a first RAT.

Step 804: Receive a "first RAT-second RAT" joint aggregation capability and at least one of a first RAT sole aggregation capability and a second RAT sole aggregation capability from the UE, when connecting to the UE.

Step 806: Transmit a second RAT configuration configuring a "first RAT-second RAT" joint aggregation to the UE according to the "first RAT-second RAT" joint aggregation capability.

Step 808: Connect to the UE via a second RAT while connecting to the UE via the first RAT, in response to transmitting the second RAT configuration.

Step 810: Transmit a first data via the first RAT and a second data via the second RAT to the UE, after connecting to the UE via both of the first RAT and the second RAT.

Step 812: End.

According the process 80, the network (e.g., including a first BS and a second BS) connects to a UE via a first RAT. When the network connects to the UE, the network receive a "first RAT-second RAT" joint aggregation capability and at least one of a first RAT sole aggregation capability and a second RAT sole aggregation capability from the UE. According to the "first RAT-second RAT" joint aggregation capability, the network transmits a second RAT configuration configuring a "first RAT-second RAT" joint aggregation to the UE. Then, the network connects to the UE via a second RAT (e.g., by the second BS) while connecting to the UE via the first RAT (e.g., by the first BS), in response to the transmission of the second RAT configuration. After (i.e., when or while) connecting to the UE via both of the first RAT and the second RAT, the network transmits a first data via the first RAT (e.g., by the first BS) and a second data via the second RAT to the UE (e.g., by the second BS).

In one example, the first BS receives the "first RAT-second RAT" joint aggregation capability from the UE. The "first RAT-second RAT" joint aggregation capability may include a first RAT capability (e.g., the first number of the first carrier(s) of the first RAT in the "first RAT-second RAT" joint aggregation) and a second RAT capability (e.g., the second number of the second carrier(s) of the second RAT in the "first RAT-second RAT" joint aggregation), as described above. In preparation of the "first RAT-second RAT" joint aggregation, the first BS may forward the "first RAT-second RAT" joint aggregation capability to the second BS. Alternatively, the first BS may forward the second RAT capability to the second BS but does not forward the first RAT capability. Then the second BS may generate the second RAT configuration according to (or considering) the second RAT capability and transmit the second RAT configuration to the first BS. The first BS may transmit the second RAT configuration to the UE when receiving the second RAT configuration. The UE and the second BS connect to each other according to the second RAT configuration.

In one example, the first BS may forward the second RAT sole aggregation capability to the second BS if the UE transmits the second RAT sole aggregation capability to the second BS. The second BS may generate a handover command according to second RAT sole aggregation capability when receiving a handover request from the first BS.

Realization of the process 80 is not limited to the above description. The previous examples related to a UE may imply corresponding operations of the network. The following examples may be applied to the process 80.

In one example, the first BS and the second BS may be different BSs. In one example, the network may receive a third data via the first BS from the UE, and may receive a fourth data via the second BS from the UE.

In one example of connecting to the UE, the network performs a transmission to the UE via the second RAT, after transmitting the second RAT configuration or receiving a confirmation from the UE for confirming that the UE receives the second RAT configuration. For example, the transmission may request the UE to transmit a random access preamble. After the network receives the random access preamble, the network transmits a random access response comprising a timing advance to the UE via the second RAT. For example, the transmission may request the UE to transmit a protocol data unit (PDU). Thus, the UE may transmit the PDU to the network in response to the transmission. For example, the transmission may request the UE to receive a time resource and/or a frequency resource. For example, the transmission may comprise a PDU.

In one example of connecting to the UE, the network receives a transmission via the second RAT from the UE. The UE may transmit the transmission via the second RAT in response to the second RAT configuration. For example, the transmission may include a random access preamble, a scheduling request or a PDU.

In one example, the network transmits a first measurement configuration for configuring (or reconfiguring) the "first RAT-second RAT" joint aggregation to the UE via the first RAT, after receiving (e.g., according to or in response to) the "first RAT-second RAT" joint aggregation capability. The first measurement configuration may indicate a first measured carrier of the second RAT and a first measurement reporting event (e.g., a second RAT neighbor cell becomes better than a threshold). The first measured carrier may belong to the second carrier(s) of the "first RAT-second RAT" joint aggregation combination. In one example, the network transmits the second RAT configuration configuring the "first RAT-second RAT" joint aggregation to the UE, after receiving (e.g., according to or in response to) a first measurement result indicating a signal of the first measured carrier is good from the UE. The second RAT configuration may configure the UE to connect to the network via the second RAT (e.g., a cell of the second RAT) on the first measured carrier. In this case, the first measured carrier becomes a serving carrier of the second RAT, and the cell becomes a serving cell of the second RAT for the UE. The UE may transmit the first measurement result to the network via the first RAT, when the UE detects that the first measurement reporting event occurs.

In one example, the network transmits a second measurement configuration for configuring the "first RAT-second RAT" joint aggregation to the UE. The second measurement configuration may indicate a second measured carrier of the second RAT and a second measurement reporting event (e.g., a neighbor cell of the second RAT becomes offset better than the serving cell of the second RAT, or a neighbor carrier becomes offset better than the serving carrier of the second RAT). When the UE detects that the second measurement reporting event occurs, the UE may transmit a second measurement reporting result to the network via the first RAT or the second RAT. The network may transmit a third RAT configuration configuring the UE to connect the neighbor cell of the second RAT (i.e., the neighbor cell becomes a new serving cell for the UE) while connecting to the first RAT. The third RAT configuration may configure the UE to release the serving cell of the second RAT.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a device and a method for handling dual cellular system aggregation. According to the present invention, the UE and/or the network can obtain the correct joint capability of the dual cellular system aggregation. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling dual cellular system aggregation, comprising:
    a storage device, for storing instructions of:
        connecting to a network via a first radio access technology (RAT);
        transmitting a "first RAT-second RAT" joint aggregation capability and at least one of a first RAT sole aggregation capability and a second RAT sole aggregation capability to the network, when connecting to the network;
        receiving a second RAT configuration configuring a "first RAT-second RAT" joint aggregation from the network;
        connecting to the network via a second RAT according to the second RAT configuration while connecting to the network via the first RAT; and
        receiving a first data via the first RAT and a second data via the second RAT, after connecting to the network via both of the first RAT and the second RAT;
    wherein the "first RAT-second RAT" joint aggregation capability indicates a "first RAT-second RAT" joint aggregation combination supported by the communication device, the "first RAT-second RAT" joint aggregation combination indicates at least one of a first number of a plurality of first carriers of the first RAT and a second number of a plurality of second carriers of the second RAT;
    wherein the first RAT sole aggregation capability indicates a first RAT sole aggregation combination supported by the communication device, and the first RAT sole aggregation combination indicates a third number of a plurality of third carriers of the first RAT; and
    a processing circuit, coupled to the storage device, configured to execute the instructions stored in the storage device.

2. The communication device of claim 1, wherein the "first RAT-second RAT" joint aggregation combination indicates a plurality of first bands and a plurality of first bandwidths for the a plurality of first carriers of the first RAT, and a plurality of second bands and a plurality of second bandwidths for the a plurality of second carriers of the second RAT.

3. The communication device of claim 1, wherein the "first RAT-second RAT" joint aggregation capability indicates a first maximum number of Multiple Input Multiple Output (MIMO) layers for the first RAT in the "first RAT-second RAT" joint aggregation combination, and indicates a second maximum number of MIMO layers for the second RAT in the "first RAT-second RAT" joint aggregation combination.

4. The communication device of claim 1, wherein the "first RAT-second RAT" joint aggregation capability indicates at least one first beamforming capability for the second RAT in the "first RAT-second RAT" joint aggregation combination.

5. The communication device of claim 1, wherein the second RAT sole aggregation capability indicates a second RAT sole aggregation combination supported by the communication device, wherein the second RAT sole aggregation combination indicates a fourth number of a plurality of fourth carriers of the second RAT, and indicates a plurality of fourth bands and a plurality of fourth bandwidths for the a plurality of four carriers of the second RAT.

6. The communication device of claim 5, wherein the second RAT sole aggregation capability indicates at least one second beamforming capability for the second RAT sole aggregation combination.

7. A network for handling dual cellular system aggregation, comprising:
    a storage device, for storing instructions of:
        connecting to a communication device via a first radio access technology (RAT);
        receiving a "first RAT-second RAT" joint aggregation capability and at least one of a first RAT sole aggregation capability and a second RAT sole aggregation capability from the communication device, when connecting to the communication device;
        transmitting a second RAT configuration configuring a "first RAT-second RAT" joint aggregation to the communication device according to the "first RAT-second RAT" joint aggregation capability;
        connecting to the communication device via a second RAT while connecting to the communication device via the first RAT, in response to transmitting the second RAT configuration, wherein the instruction of connecting to the communication device comprises performing a first transmission to the communication device via the second RAT, after transmitting the second RAT configuration or receiving a confirmation from the communication device for confirming that the communication device receives the second RAT configuration; and
        transmitting a first data via the first RAT and a second data via the second RAT to the communication device, after connecting to the communication device via both of the first RAT and the second RAT; and
    a processing circuit, coupled to the storage device, configured to execute the instructions stored in the storage device.

8. The network of claim 7, wherein the first transmission requests the communication device to transmit a random access preamble, requests the communication device to transmit a protocol data unit (PDU), and requests the communication device to receive a time resource or a frequency resource.

9. The network of claim 7, wherein the storage device further stores the instructions of:
    transmitting a first measurement configuration for configuring the "first RAT-second RAT" joint aggregation to the communication device via the first RAT, according to the "first RAT-second RAT" joint aggregation capability, wherein the first measurement configuration indicates a first measured carrier of the second RAT and a first measurement reporting event.

10. The network of claim 7, wherein the storage device further stores the instructions of:
    transmitting a second measurement configuration for configuring the "first RAT-second RAT" joint aggregation to the communication device, wherein the second measurement configuration indicates a second measured carrier of the second RAT and a second measurement reporting event.

11. The network of claim 7, wherein the "first RAT-second RAT" joint aggregation capability indicates a "first RAT-second RAT" joint aggregation combination supported by the communication device, wherein the "first RAT-second RAT" joint aggregation combination indicates at least one of a first number of a plurality of first carriers of the first RAT and a second number of a plurality of second carriers of the second RAT; and the first RAT sole aggregation capability indicates a first RAT sole aggregation combination supported by the communication device, wherein the first RAT sole aggregation combination indicates a third number of a plurality of third carriers of the first RAT.

12. The network of claim 11, wherein the "first RAT-second RAT" joint aggregation combination indicates a plurality of first bands and a plurality of first bandwidths for the a plurality of first carriers of the first RAT, and a plurality of second bands and a plurality of second bandwidths for the a plurality of second carriers of the second RAT.

13. The network of claim 11, wherein the "first RAT-second RAT" joint aggregation capability indicates a first maximum number of MIMO layers for the first RAT in the "first RAT-second RAT" joint aggregation combination, and indicates a second maximum number of MIMO layers for the second RAT in the "first RAT-second RAT" joint aggregation combination.

14. The network of claim 11, wherein the "first RAT-second RAT" joint aggregation capability indicates at least one first beamforming capability for the second RAT in the "first RAT-second RAT" joint aggregation combination.

* * * * *